(No Model.)
F. G. & A. C. SARGENT.
PICKER CYLINDER AND METHOD OF APPLYING COVERINGS THERETO.
No. 425,087. Patented Apr. 8, 1890.
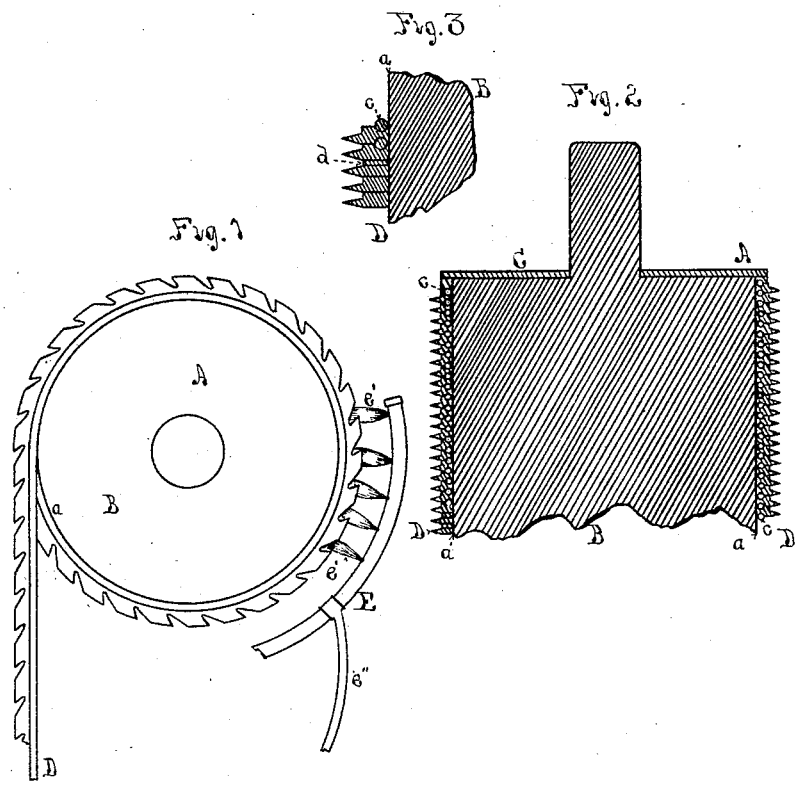
Witnesses
N. P. Ockington
C. E. Wittergreen
Inventor
Frederick G. Sargent
Allan C. Sargent
By David Hall Rice
Their Atty.

UNITED STATES PATENT OFFICE.

FREDERICK G. SARGENT AND ALLAN C. SARGENT, OF GRANITEVILLE, MASSACHUSETTS.

PICKER-CYLINDER AND METHOD OF APPLYING COVERINGS THERETO.

SPECIFICATION forming part of Letters Patent No. 425,087, dated April 8, 1890.

Application filed October 16, 1882. Serial No. 74,300. (No model.) Patented in England July 13, 1883, No. 3,462.

*To all whom it may concern:*

Be it known that we, FREDERICK G. SARGENT and ALLAN C. SARGENT, of Graniteville, in the county of Middlesex and State of Massachusetts, have invented a new and useful Improvement in Picker-Cylinders and Methods of Applying Coverings Thereto, (for which we have received British Patent No. 3,462, dated July 13, 1883,) of which the following is a specification.

Our invention relates to cylinders for picking and burring machines for opening wool and other fibrous substances; and it consists in a cylinder having the strips of metal upon which the teeth of the cylinder are formed united to each other and to the metallic surface of the cylinder while the strips are being wound upon the cylinder in successive coils, so as to form them into an entire homogeneous surface when the cylinder is completed; and it further consists in the method or process of accomplishing this result, all substantially as hereinafter described.

In the drawings, Figure 1 represents a picker-cylinder in process of having our invention applied to it. Fig. 2 is a section of a portion of the cylinder when completed. Fig. 3 is an enlarged detailed view of a portion of Fig. 2.

A is the picker-cylinder, composed of a central body B, of wood or other suitable material. Its cylindrical surface is covered by the metallic sheet $a$. A metallic cap C covers the end of the cylinder.

D represents the strips of metal in which the teeth are cut, which are wound spirally around the cylinder with the successive layers or coils adjacent to each other to form a continuous toothed surface for the cylinder when completed. Sometimes the strips of metal having the teeth cut on their edges are shouldered on one side to form a space between the successive rows of teeth, and at other times thin strips of metal $d$ are inserted between the successive coils of the toothed strip to form this space between the teeth on the finished cylinder. Grooves are made in the sides of the toothed strip D, into which wires $c$ are inserted to hold the coils of the strip in place, as shown. These methods of fastening the toothed strip upon the cylinder are well known and require no further description to be readily understood.

Our invention consists in covering the metal sheet $a$, surrounding the cylinder, with solder or tin, which can be readily fused, and also in covering the toothed strip D with solder or tin before applying it to the cylinder. The cylinder is then suspended by its end bearings in any suitable supports which will enable it to be easily revolved. A gas-pipe E, of a curved form conforming to the circumference of the cylinder and having small holes for lighted jets of gas $e'$, is then mounted in such a position to the cylinder on the arm $e''$ that as the strip D is wound upon the cylinder and it is slowly revolved the lighted jets of gas will impinge against the toothed strip as it is wound upon the cylinder, while the latter is thus revolved in the usual manner. This causes the solder or tin upon the strip D and the metal sheet $a$ to be continuously and progressively melted and fused together and the successive coils of the strip D to be soldered to those previously wound upon the cylinder as the winding process is carried on. The toothed surface of the cylinder thus becomes when completed a homogeneous metallic surface, possessing great cohesion in all its parts, and increases its durability very greatly. By this method of formation it also preserves the fit of the metallic surface of the cylinder to the body part thereof, so that it is more perfect when connected than by other methods of formation. The arm $e''$ is so arranged that the gas-pipe E can be shifted along the surface of the cylinder, as the coils are required to be subjected to the heat while being successively wound upon it; or the cylinder may be mounted in shifting bearings, so as to move it endwise past the pipe E, and accomplish the same result. By this process we accomplish the soldering in an economical and expeditious manner and without loss of time.

What we claim as new and of our invention is—

1. The toothed picker-cylinder A, having the central supporting body part B, the sheet-metal covering thereof a, and its successive coils of toothed metal cemented or soldered together and to said metal covering a, whereby the latter is both strengthened and retained in its form, fitting to the form of body part B, substantially as described.

2. The method of forming and uniting the toothed strip D and the metal covering a into a homogeneous outer shell of the picker-cylinder A, which consists in applying solder to them and soldering the toothed strip D to itself and to the metal a while it is being wound upon the latter in successive coils, substantially as described.

3. In combination with the successive coils of the toothed strip D, forming the cylinder-surface, the intervening holding-wires c, the whole being soldered or cemented together, substantially as described.

F. G. SARGENT.
A. C. SARGENT.

Witnesses:
HENRY W. CHURCH,
ARTHUR B. PLIMPTON.